(12) United States Patent
Lillard et al.

(10) Patent No.: US 9,438,730 B1
(45) Date of Patent: *Sep. 6, 2016

(54) USING A SPEECH ANALYTICS SYSTEM TO OFFER CALLBACKS

(71) Applicant: Noble Systems Corporation, Atlanta, GA (US)

(72) Inventors: Bryan T. Lillard, Canton, GA (US); Parimal R. Patel, Atlanta, GA (US); Eyob Mekonnen, Atlanta, GA (US); Jason P. Ouimette, Berkeley Lake, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/081,358

(22) Filed: Mar. 25, 2016

Related U.S. Application Data

(63) Continuation of application No. 14/875,130, filed on Oct. 5, 2015, now Pat. No. 9,350,866, which is a continuation of application No. 14/186,404, filed on Feb. 21, 2014, now Pat. No. 9,191,508, which is a continuation-in-part of application No. 14/073,083, filed on Nov. 6, 2013, and a continuation-in-part of application No. 14/080,912, filed on Nov. 15, 2013.

(51) Int. Cl.
| | |
|---|---|
| *H04M 1/64* | (2006.01) |
| *H04M 3/493* | (2006.01) |
| *G10L 15/30* | (2013.01) |
| *H04M 3/48* | (2006.01) |
| *G10L 15/08* | (2006.01) |
| *G10L 15/22* | (2006.01) |

(52) U.S. Cl.
CPC ............ *H04M 3/4936* (2013.01); *G10L 15/30* (2013.01); *H04M 3/48* (2013.01); *G10L 2015/088* (2013.01); *G10L 2015/225* (2013.01)

(58) Field of Classification Search
CPC .... H04M 3/42; H04M 3/48; H04M 3/42221; H04M 3/4936
USPC .............................. 379/88.02, 210.01, 266.06
See application file for complete search history.

(56) References Cited

U.S. PATENT DOCUMENTS

| | | | |
|---|---|---|---|
| 5,267,305 | A | 11/1993 | Prohs et al. |
| 5,270,920 | A | 12/1993 | Pearse et al. |
| 6,157,808 | A | 12/2000 | Hollingsworth et al. |

(Continued)

OTHER PUBLICATIONS

Notice of Allowance Received for U.S. Appl. No. 14/073,083 dated May 25, 2016.

(Continued)

*Primary Examiner* — Van D Huynh

(57) ABSTRACT

Various embodiments of the invention provide methods, systems, and computer-program products for setting up a callback for a party placed on hold. In particular embodiments, speech analytics is used to listen in on a party once the party has been placed on hold for a keyword spoken by the party indicating the party would like to receive a callback. In response to detecting the keyword spoken by the party, a notification is sent to a component such as an IVR and in turn, the IVR interacts with the party to obtain information from the party with respect to placing a callback to the party. Accordingly, this information is recorded so that a callback can be placed to the party at a later time by some type of call handler component such as, for example, a dialer or PBX.

17 Claims, 6 Drawing Sheets

(56) References Cited

U.S. PATENT DOCUMENTS

| | | | |
|---|---|---|---|
| 6,356,634 B1 | 3/2002 | Noble, Jr. | |
| 6,862,343 B1 | 3/2005 | Vacek et al. | |
| 7,133,828 B2 | 11/2006 | Scarano et al. | |
| 7,542,902 B2 | 6/2009 | Scahill et al. | |
| 7,548,539 B2 | 6/2009 | Kouretas et al. | |
| 7,574,000 B2 | 8/2009 | Blair | |
| 7,672,845 B2 | 3/2010 | Beranek et al. | |
| 7,752,043 B2 | 7/2010 | Watson | |
| 7,930,179 B1 | 4/2011 | Gorin et al. | |
| 7,974,411 B2 | 7/2011 | Krishnapuram et al. | |
| 8,078,470 B2 | 12/2011 | Levanon | |
| 8,094,790 B2 | 1/2012 | Conway et al. | |
| 8,094,803 B2 | 1/2012 | Danson et al. | |
| 8,155,297 B1* | 4/2012 | Dhir | H04M 3/42195 379/210.01 |
| 8,175,007 B2 | 5/2012 | Jain et al. | |
| 8,180,643 B1 | 5/2012 | Pettay et al. | |
| 8,204,180 B1 | 6/2012 | Narayanan et al. | |
| 8,209,182 B2 | 6/2012 | Narayanan | |
| 8,219,401 B1 | 7/2012 | Pettay et al. | |
| 8,249,875 B2 | 8/2012 | Levanon et al. | |
| 8,275,115 B1 | 9/2012 | Everingham et al. | |
| 8,396,205 B1 | 3/2013 | Lowry et al. | |
| 8,396,732 B1 | 3/2013 | Nies et al. | |
| 8,401,155 B1 | 3/2013 | Barnes et al. | |
| 8,422,641 B2 | 4/2013 | Martin, II | |
| 8,463,606 B2 | 6/2013 | Scott et al. | |
| 8,504,371 B1 | 8/2013 | Vacek et al. | |
| 8,531,501 B2 | 9/2013 | Portman et al. | |
| 8,761,376 B2 | 6/2014 | Pande et al. | |
| 8,767,948 B1 | 7/2014 | Riahi et al. | |
| 8,781,092 B2* | 7/2014 | Noble, Jr. | H04M 3/5231 379/209.01 |
| 8,831,204 B1 | 9/2014 | Pycko et al. | |
| 8,949,128 B2 | 2/2015 | Meyer et al. | |
| 9,014,364 B1 | 4/2015 | Koster et al. | |
| 2003/0002651 A1 | 1/2003 | Shires | |
| 2003/0154120 A1 | 8/2003 | Freishtat et al. | |
| 2004/0008828 A1 | 1/2004 | Coles et al. | |
| 2004/0249650 A1 | 12/2004 | Freedman et al. | |
| 2005/0226395 A1 | 10/2005 | Benco et al. | |
| 2005/0238161 A1 | 10/2005 | Yacoub et al. | |
| 2005/0286705 A1 | 12/2005 | Contolini et al. | |
| 2005/0286706 A1 | 12/2005 | Fuller | |
| 2006/0050658 A1 | 3/2006 | Shaffer et al. | |
| 2006/0111953 A1 | 5/2006 | Setya | |
| 2006/0233346 A1 | 10/2006 | McIlwaine et al. | |
| 2006/0256954 A1 | 11/2006 | Patel et al. | |
| 2006/0259473 A1 | 11/2006 | Li et al. | |
| 2006/0262919 A1 | 11/2006 | Danson et al. | |
| 2006/0265090 A1 | 11/2006 | Conway et al. | |
| 2007/0088563 A1 | 4/2007 | Nardotti, Jr. et al. | |
| 2007/0111180 A1 | 5/2007 | Sperle et al. | |
| 2007/0160054 A1 | 7/2007 | Shaffer et al. | |
| 2007/0280211 A1 | 12/2007 | Malueg et al. | |
| 2007/0280460 A1* | 12/2007 | Harris | H04M 3/5166 379/201.01 |
| 2008/0002823 A1 | 1/2008 | Fama et al. | |
| 2008/0027785 A1 | 1/2008 | Mechaley et al. | |
| 2008/0037719 A1 | 2/2008 | Doren | |
| 2008/0082330 A1 | 4/2008 | Blair | |
| 2008/0240376 A1 | 10/2008 | Conway et al. | |
| 2008/0270123 A1 | 10/2008 | Levanon et al. | |
| 2009/0157449 A1 | 6/2009 | Itani et al. | |
| 2009/0295536 A1 | 12/2009 | Doren | |
| 2010/0036670 A1 | 2/2010 | Hill et al. | |
| 2010/0082342 A1 | 4/2010 | Erhart et al. | |
| 2010/0104086 A1 | 4/2010 | Park | |
| 2010/0138411 A1 | 6/2010 | Judy et al. | |
| 2010/0158237 A1 | 6/2010 | McCormack et al. | |
| 2010/0161990 A1 | 6/2010 | Statham et al. | |
| 2011/0010173 A1 | 1/2011 | Scott et al. | |
| 2011/0026688 A1 | 2/2011 | Simpson | |
| 2011/0033036 A1 | 2/2011 | Edwards et al. | |
| 2011/0125499 A1 | 5/2011 | Griggs et al. | |
| 2011/0145093 A1 | 6/2011 | Paradise et al. | |
| 2011/0202344 A1 | 8/2011 | Meyer et al. | |
| 2011/0218798 A1 | 9/2011 | Gavalda | |
| 2011/0228919 A1 | 9/2011 | Tew et al. | |
| 2011/0287748 A1 | 11/2011 | Angel et al. | |
| 2011/0307258 A1 | 12/2011 | Liberman et al. | |
| 2011/0317828 A1 | 12/2011 | Corfield | |
| 2012/0045043 A1 | 2/2012 | Timpson | |
| 2012/0140911 A1 | 6/2012 | Johansen et al. | |
| 2012/0263285 A1 | 10/2012 | Rajakumar et al. | |
| 2013/0003943 A1 | 1/2013 | Munns et al. | |
| 2013/0129069 A1 | 5/2013 | Peterson | |
| 2013/0246053 A1 | 9/2013 | Scott et al. | |
| 2013/0266127 A1 | 10/2013 | Schachter et al. | |
| 2014/0100848 A1 | 4/2014 | Shaffer et al. | |
| 2014/0140496 A1 | 5/2014 | Ripa et al. | |
| 2014/0140497 A1 | 5/2014 | Ripa et al. | |
| 2014/0163960 A1 | 6/2014 | Dimitriadis et al. | |
| 2014/0241519 A1 | 8/2014 | Watson et al. | |
| 2014/0257820 A1 | 9/2014 | Laperdon et al. | |
| 2014/0379525 A1 | 12/2014 | Timem et al. | |
| 2015/0106091 A1 | 4/2015 | Wetjen et al. | |
| 2015/0281446 A1 | 10/2015 | Milstein et al. | |

OTHER PUBLICATIONS

Office Action Received for U.S. Appl. No. 14/230,463 dated Mar. 30, 2016.

Asterisk DTMF, Voip=Info.o—A Reference Guide to All Things VoIP, four pages, retrieved on Mar. 18, 2013 from www.voip-info.org/wiki/view/Asterosk+DTMF.

Notice of Allowance received for U.S. Appl. No. 13/861,102, mailed May 2, 2014.

U.S. Appl. No. 61/7753,641, filed Dec. 31, 1899, Watson et al.

Office Action Received for U.S. Appl. No. 13/949,467 dated Feb. 6, 2015.

Notice of Allowance Received for U.S. Appl. No. 13/949,467 dated Jul. 17, 2015.

Office Action Received for U.S. Appl. No. 13/968,692 dated Jun. 11, 2015.

Office Action Received for U.S. Appl. No. 13/968,692 dated Nov. 30, 2015.

Office Action Received for U.S. Appl. No. 14/073,083 dated Feb. 16, 2016.

Office Action Received for U.S. Appl. No. 14/172,993 dated Dec. 18, 2015.

Office Action Received for U.S. Appl. No. 14/445,501 dated Nov. 24, 2015.

Notice of Allowance Received for U.S. Appl. No. 14/445,501 dated Feb. 4, 2016.

Office Action Received for U.S. Appl. No. 14/230,463 dated Jun. 19, 2015.

Office Action Received for U.S. Appl. No. 14/230,463 dated Oct. 1, 2015.

Office Action Received for U.S. Appl. No. 14/230,463 dated Jan. 14, 2016.

Office Action Received for U.S. Appl. No. 14/230,328 dated Nov. 28, 2014.

Notice of Allowance Received for U.S. Appl. No. 14/230,328 dated Feb. 6, 2015.

Office Action Received for U.S. Appl. No. 14/661,676 dated Sep. 21, 2015.

Notice of Allowance Received for U.S. Appl. No. 14/661,676 dated Nov. 20, 2015.

Schulzrinne,H; Petrack, S; Request for Comments 2833 ("RFC 2833"), RTP Payload for DTMF Digits, Telephony Tone, and Telephony Signals May 2000, 29 pages, The Internet Society, U.S.

Donovan, S; Request for Comments 2976 ("RFC 2976"), The SIP INFO Method; The Internet Society, Oct. 2000, 9 pages, U.S.

Burger, E.; Dolly, M; Request for Comments 4730 ("RFC 4730"), A Session Initiation Protocol (SIP) Event Package for Key Press Stimulus (KPML), The Internet Society, Nov. 2006, 56 pages, U.S.

Schulzerinne,H; Taylor, T; Request for Comments 4733 ("RFC 4733"), RTP Payload for DTMF Digits, Telephony Tones, and Telephony Signals, The IETF Trust, Dec. 2006, 46 pages, U.S.

(56) References Cited

OTHER PUBLICATIONS

Homberg, C; Burger, E; Kaplan, H.; Request for Comments 6086 ("RFC 6086"), Session Initiation Protocol (SIP) Info Method and Package Framework, Internet Engineering Task Force, Jan. 2011, 36 pages, U.S.

Kuthan, Jiri; Sisalem, Dorgham; SIP: More Than You Ever Wanted to Know About; Powerpoint Presentation, Mar. 2007, 242 pages, Tekelec, U.S.

Three Steps for Attacking Adherence Problems, Reynolds, Penny, Contact Center Association, Jan. 24, 2012.

Office Action Received for U.S. Appl. No. 14/080,912 dated Apr. 8, 2016.

Office Action Received for U.S. Appl. No. 14/743,200 dated Apr. 7, 2016.

* cited by examiner

USING A SPEECH ANALYTICS SYSTEM TO OFFER CALLBACKS

CROSS REFERENCE TO RELATED PATENT APPLICATIONS

This application is a continuation of U.S. patent application Ser. No. 14/875,130, entitled "Using a Speech Analytics System of Offer Callbacks," filed on Oct. 5, 2015, which is a continuation of U.S. patent application Ser. No. 14/186,404, now U.S. Pat. No. 9,191,508, and entitled "Using a Speech Analytics System to Offer Callbacks," filed on Feb. 21, 2014, which is a continuation-in-part of U.S. patent application Ser. No. 14/080,912, entitled "Architecture for Processing Real Time Event Notifications from A Speech Analytics System," filed on Nov. 15, 2013, and a continuation-in-part of U.S. patent application Ser. No. 14/073,083 entitled "Configuring Contact Center Components for Real Time Speech Analytics," filed on Nov. 6, 2013, for which the contents of all are incorporated by reference for all that they teach.

BACKGROUND

Contact centers frequently handle more calls (e.g., placed or received) at any given time than the centers have available agents to field the calls. When this occurs, in many instances, the "excess" calls are placed on hold in a queue until agents become available to field these calls. However, the time a particular call remains on hold in the queue can vary greatly. As a result, the parties on excess calls that remain on hold too long often become impatient and frustrated. This can lead to these frustrated parties simply hanging up.

In some instances, contact centers have attempted to combat this problem by offering a party an opportunity to receive a callback call ("callback") instead of being placed on hold. However, if the party decides to forgo a callback and instead be placed on hold, often the party is then placed on hold without any further consideration by the contact center until an agent becomes available to field the party's call. As a result, many such parties placed on hold after forgoing a callback still become impatient and frustrated for remaining on hold too long. Thus, a need exists in the industry for a better process for handling calls that have been placed on hold with respect to providing the parties on these calls opportunities to receive a callback. It is with respect to this consideration and others that the disclosure herein is presented.

BRIEF SUMMARY

In general, embodiments of the present invention provide computer-program products, methods, systems, apparatus, and computing entities for setting up a callback for a party placed on hold. Specifically, various embodiments involving using speech analytics to listen in on a party once the party has been placed on hold for a keyword spoken by the party indicating the party would like to receive a callback. For instance, in particular embodiments, the keyword may demonstrate frustration by the party for remaining on hold too long. In response to detecting the keyword spoken by the party, a notification is sent to a component such as an interactive voice response system ("IVR") indicating the party would like to receive a callback and in turn, the component interacts with the party to obtain information from the party with respect to placing a callback to the party. For instance, the component may inquire as to the telephone number the party would like the callback placed to and a time the party would like to receive the callback. Accordingly, this information is recorded so that a callback can be placed to the party at a later time by some type of call handler device such as, for example, a dialer or PBX.

In particular embodiments, the component may also interact with the party after a predetermined period of time that the party has been on hold to determine whether the party would like to receive a callback or whether the party would like to remain on hold. In addition, in particular embodiments, the component may also provide the party with an approximate time the party is expected to remain on hold. Furthermore, in particular embodiments, the component may provide the party with an option to receive a callback upon initially receiving a call from the party.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
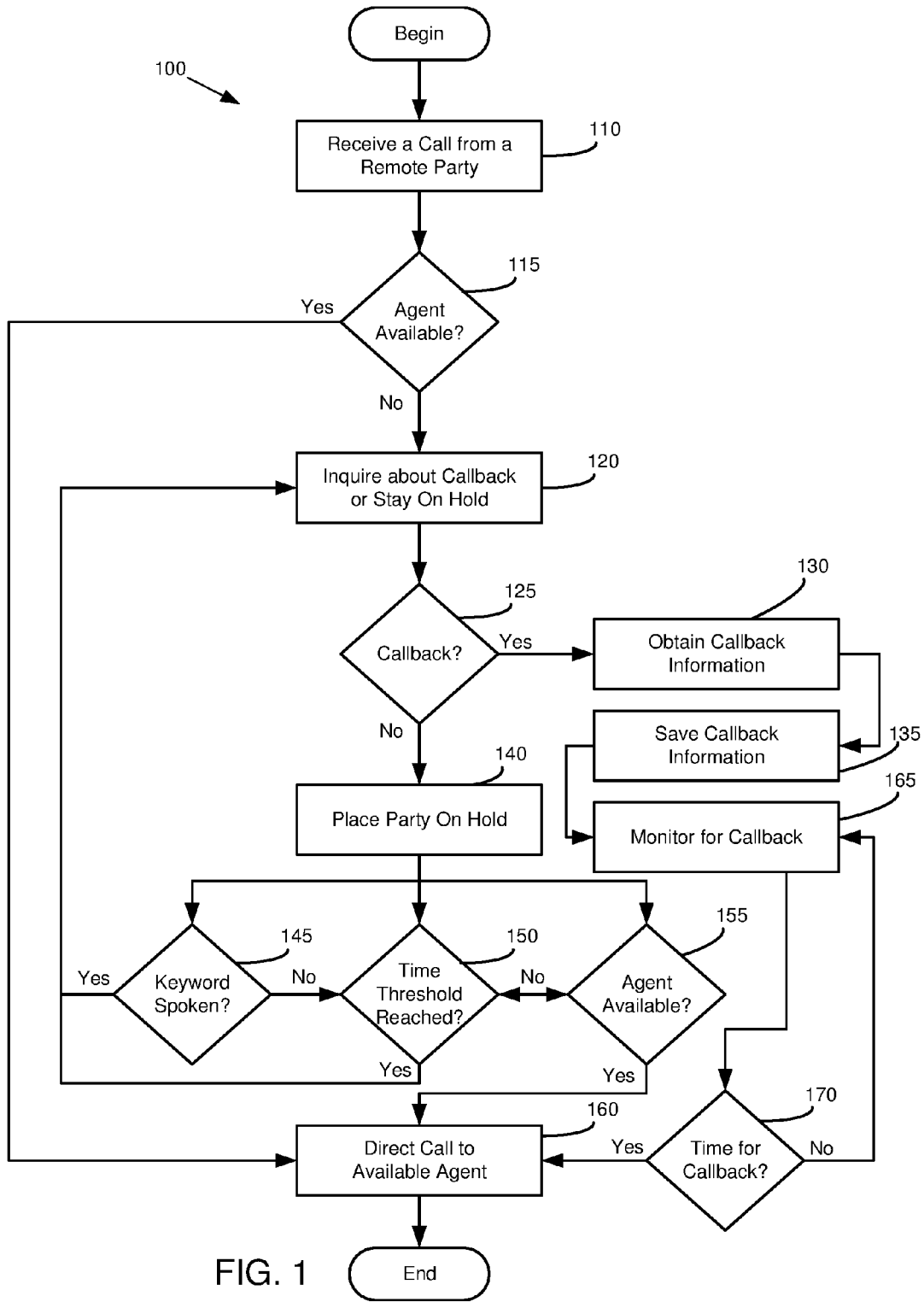
FIG. 1 illustrates an embodiment of a general process flow for practicing the various technologies and concepts disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Additional information regarding the operation of a contact center with respect to a speech analytics system is provided in the disclosures of the above-mentioned patent applications. This information describes various components that may be present in a contact center, how event notifications from the speech analytics system are generally processed, and how application specific modules may process event notifications for specific calls to implement specific capabilities or applications. The description of the overall framework is not repeated herein, but incorporated by reference to provide supporting disclosure with respect to using the speech analytics system for offering callbacks to parties on hold.

Although the examples provided herein illustrate the concepts in which a contact center is receiving calls placed by calling parties, the concepts could apply to other types of calls such as, for instance, outgoing calls placed by the contact center to called parties. Accordingly, voice calls (or simply "calls") are directed to the contact center from a remote party. The term "remote party" refers to the party interacting with the contact center. The purpose of the call may be placed for any number of different reasons. For instance, a remote party may be calling the contact center to receive support for a product, to make a purchase, and/or to inquire about information the remote party is interested in receiving. In many instances, the contact center employs a plurality of agents to "field" these incoming calls. However, at any given instance when the contact center receives a call, all of the agents currently working may be busy handling other calls for the contact center. Thus, the contact center may place the remote party in a queue (e.g., on hold) until an agent becomes available to field the call from the remote party.

Depending on the circumstances (e.g., the number of agents working and the number of calls being received by the contact center), the remote party may remain on hold for a relatively short period of time, a relatively long period of time, or somewhere in between before an agent becomes available to field the call. During this "hold" time, the remote party may become impatient waiting for an available agent and become frustrated with having to wait so long before speaking with an agent. Some contact centers have attempted to combat this issue by offering the remote party an option of receiving a callback instead of being placed on hold. However, once the remote party has decided to remain on hold and has been placed in the queue, the remote party may still become frustrated as the time spent in the queue becomes extensive.

Once a remote party has been placed on hold, the use of a speech analytics system ("SAS") in various embodiments of the invention allows the contact center to monitor the remote party while remaining on hold so that the contact center can determine if the remote party is becoming frustrated. This is accomplished by the SAS monitoring for the presence of certain keywords or phrases that may be uttered by the remote party while the party waits in the "on hold" queue.

In various embodiments, the SAS comprises a speech analytics module ("SAM") configured to detect certain keywords (these keywords may also encompass phrases, logical constructs comprising multiple words in proximity to each other, as well as in some instances emotions detected from spoken words). Upon detecting keywords, the SAM may generate "event notifications" that may indicate the keywords detected or some type of context with respect to the keywords. The event notifications are provided by the SAM to an event handler module ("EHM"), which in turn may provide the event notifications to an application specific module ("ASM"). In particular embodiments, an ASM is a software module configured for a particular application (hence, it is application specific). In this particular case, the ASM controls the process of offering the remote party an opportunity to receive a callback from the contact center so that the party does not need to remain on hold.

General Process Flow

FIG. 1 illustrates an embodiment of a process flow for providing remote parties on hold opportunities to receive callbacks instead of remaining on hold. The general approach for this process is to initially offer a remote party the option to receive a callback or to be placed on hold when an agent is not immediately available to handle the call associated with the remote party. If the party does decide to be placed on hold, then the process may involve offering the party another opportunity to receive a callback instead of remaining on hold. Depending on the embodiment, the additional opportunity may be triggered by one or more events such as the remote party remaining on hold for a predetermined amount of time, the remote party verbally requesting a callback while on hold, and/or the remote party expressing some type of frustration as a result of remaining on hold.

Turning now to FIG. 1, the process 100 begins with the contact center receiving a call from a remote party in Step 110. Depending on the contact center, the call may be received by one or more different call handler components within the call center such as, for instance, an automatic call distributor ("ACDs"), interactive voice response system ("IVR"), dialer, predictive dialer, and/or private branch exchange ("PBXs"). However, for purposes of explaining the process 100 shown in FIG. 1, the call handler component is an IVR.

Generally speaking, an IVR may play voice prompts to the remote party and may collect and analyze responses from the remote party in the form of dual-tone multiple frequency ("DMTF") tones and/or speech. In addition, depending on the circumstances, the IVR may be used to further identify the purpose of the call, such as, for example, prompting the party to enter account information or otherwise obtain information used to service the call. Once the IVR has obtained needed information, the IVR may then determine whether an agent is available at the contact center to field the call from the remote party in Step 115. If so, then the IVR may direct the call to the available agent in Step 155 and the agent may then handle the call with the remote party.

However, if an agent is not available to handle the call, then the IVR may inquire as to whether the remote party may wish to receive a callback in a fixed amount of time, at a time when an agent is available, or be placed on hold until an agent becomes available in Step 120. Again, the IVR receives a response from the remote party and determines whether the remote party would like to set up a callback or to be placed on hold in Step 125. If the remote party would like to set up a callback, then the IVR obtains callback information from the remote party in Step 130. For instance, the IVR may ask if the remote party would like to receive the callback using the same phone number the remote party is currently using for the call or would like to receive the callback to a different phone number. In addition, the IVR may ask the remote party when (e.g., time and date) he or she would like to received the callback. Once the IVR has obtained the needed information for the callback, the IVR records the information in Step 135 and the call with the remote party is ended.

At this point, one or more components in the contact center monitor the callback information to determine when the callback should be placed to the remote party in Step 165. Depending on the embodiment, any number of different components in the contact center may carry out the monitoring step such as, for example, the IVR or a dialer that periodically reviews the information for the callback to determine whether the callback should be placed. Accordingly, in Step 170, the monitoring component(s) determine whether the callback should be placed and if so, then a callback is made to the remote party. The callback may be made by the monitoring component(s) or one or more other components of the contact center. Although not shown in FIG. 1, in particular embodiments, the monitoring component(s) and/or the component(s) placing the callback may first determine that an agent is available prior to placing the callback to the remote party. While in other embodiments, information for the callback may be forwarded to an available agent and the agent controls the placing of the callback to the remote party. Thus, once the callback is placed to the remote party, the callback is directed to the available agent in Step 160.

Returning now to Step 125, if instead the remote party wishes to be placed on hold instead of setting up a callback, then the party is placed on hold in Step 140. At this point in particular embodiments, a speech analytics system monitors the remote party placed on hold to detect instances in which the party may not wish to remain on hold any longer and may prefer to receive a callback. Thus, in particular embodiments, the speech analytics system determines whether the remote party speaks a keyword indicating an instance in which the party no longer wishes to remain on hold and wishes to now receive a callback in Step 145.

Depending on the embodiment, the speech analytics system may monitor for one or more particular words or phrases to be spoken to indicate such an occurrence. Thus, the term "keyword" does not necessarily indicate a particular word but may also indicate a group of words (phrases) and/or in some instances, a particular sound that is made by the remote party such as a sigh or a moan, or a particular emotion detected from the remote party's words or non-verbal utterances such as anger or frustration. Accordingly, depending on the embodiment, the speech analytics system monitoring a call to detect a keyword being spoken by the remote party may include: (1) monitoring the call to detect the remote party speaking a particular word, group of words, and/or multiple words in proximity to each other; (2) monitoring the call to detect the remote party uttering one or more sounds; and/or (3) monitoring the call to detect the present of one or more emotions perceived from words spoken and/or sounds made by the remote party.

For instance, in particular embodiments, the remote party may be informed by the IVR before being placed on hold that any time during the time on hold, if the party would like to receive a callback instead of remaining on hold to simply say the word "callback." While in other embodiments, the speech analytics system may monitor for keywords that indicate the remote party is becoming frustrated as he or she remains on hold. While further in other embodiments, the speech analytics system may monitor to detect emotions indicating the remote party is becoming frustrated as he or she remains on hold. If a determination is made that the remote party has spoken a keyword, then the process 100 returns to Step 120 to inquire as to whether the remote party would now like to set up a callback or remain on hold. If the remote party indicates that he or she would now like to set up a callback, then the process 100 continues on to Step 130 and the callback information is obtained from the remote party as described earlier.

In addition, the time the remote party remains on hold may be monitored in Step 150 to determine when a time threshold has been reached that the party has remained on hold. For instance, the time threshold may be set at fifteen minutes. Therefore, once the remote party has remained on hold for fifteen minutes, the process 100 returns to Step 120 to inquire as to whether the remote party would now like to set up a callback or remain on hold. If the remote party indicates that he or she would now like to set up a callback, then the process 100 continues on to Step 130 and the callback information is obtained from the remote party as described earlier.

Finally, the agents are monitored to determine whether an agent may have become available to handle the call in Step 155. If so, then the remote party may be directed to the available agent to handle the call in Step 160. Accordingly, as a result of this process 100, the remote party is given multiple opportunities to request a callback even after the remote party has been placed on hold for an available agent. As a result, the remote party is less likely to become irritated and/or frustrated and the contact center is better able to accommodate those who contact or are contacted by the contact center.

Contact Center Architecture

Figure 2:
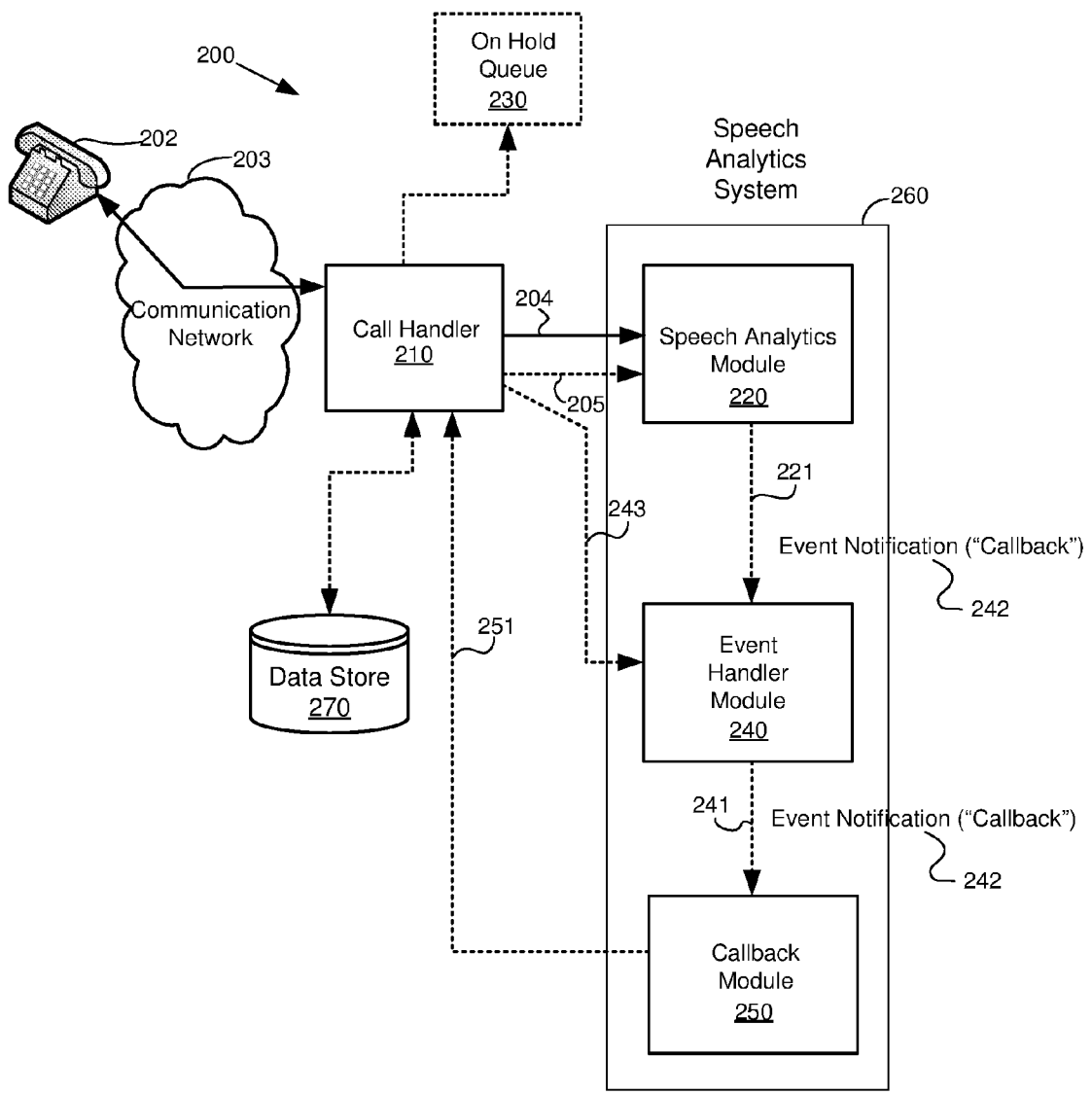
FIG. 2 illustrates an architecture of one embodiment of a contact center wherein a speech analytics system is used to offer parties on hold callbacks according to various embodiments of the invention.

Turning now to FIG. 2, a high level architecture 200 of one embodiment of the relevant components involved in implementing embodiments of the invention is shown. The architecture 200 shows a remote party represented by a conventional telephone 202, although any number of devices and technologies may be used by the remote party. As previously mentioned, for purposes of illustration, and not for limitation, the examples herein focus on the contact center receiving a call from the remote party, although it should be readily apparent that the principles can equally apply to a call originated by the contact center to the remote party. Although the remote party is shown as using a conventional telephone and the communication network 203 is shown as a telephone network, other networks and communications technologies may be employed, such as Voice over IP ("VoIP"), cable networks, mobile networks, etc.

The remote party originates a call that is routed by the communication network 203 and received by a call handler 210. As previously mentioned, the call handler 210 may be one of any number of various devices used for processing calls in a contact center, including but not limited to: automatic call distributors ("ACDs"), interactive voice response systems ("IVRs"), dialers, predictive dialers, private branch exchanges ("PBXs"), etc. However, for purposes of illustration, and not for limitation, the examples herein focus on the call handler being an IVR.

Also shown in FIG. 2 is a speech analytics system ("SAS") 260. For the particular embodiment shown in FIG. 2, the SAS 260 comprises a speech analytics module ("SAM") 220, an event handler module ("EHM") 240, and an application specific module ("ASM"), more specifically a callback module 250. These modules cooperate so as to monitor the remote party after being placed on hold and providing opportunities for the remote party to receive a callback. Additional detail is provided below as to how these modules cooperate to accomplish this task.

In particular embodiments, each of these modules 220, 240, 250 may be a software module comprising a set of computer instructions that are executing in separate hardware processing systems or in a single common hardware system. While in other embodiments, other variations are possible. For instance, in particular embodiments, the SAM 220, the EHM 240, and/or the callback module 250 may be integrated into one module.

Further, in particular embodiments, one or more of the components may be offered as a service by a service provider or implemented in a premised-based solution for a contact center. For example, in particular embodiments, the call handler 210 may be offered as a premise-based or a hosted service (e.g., in the "cloud") that bridges on the SAS 260 that is also offered as a hosted service. Thus, the call handler 210 and the SAS 260 may be remotely located from each other and be operated and controlled by different entities. While in other embodiments, separate components of the SAS 260 may be offered as a service by a service provider. For instance, in one embodiment, a component performing the speech analytics (e.g., the SAM 220) may be provided thru a service provider. Accordingly, to clarify the inventive concepts in this application, the description of various embodiments is based on describing various functions in terms of modules and their interaction with each other, recognizing that these modules may be deployed in various physical components at different locations.

For purposes of illustration, the SAM 220 in one embodiment is only bridged onto the call once it is determined a remote party has been placed on hold. That is, the SAM 220 is not automatically bridged onto the call when initially received. However, there may be other reasons why the SAM 220 is automatically bridged onto the call for purposes of monitoring the call such as those described in U.S. patent application Ser. No. 13/949,467, entitled "Management System for Using Speech Analytics to Enhance Contact Center Agent Conformance," filed on Jul. 24, 2013, the contents of which are incorporate by reference.

In particular embodiments, for the SAM 220 to monitor the words spoken and/or sounds made by a remote party placed on hold, an audio leg (or "call leg") 204 is used. This may be accomplished by establishing a conference bridge that allows the SAM 220 to listen in on the remote party while the party is on hold. Thus, in particular instances, such arrangement creates a conference call involving the remote party, the call hander 210, and the SAM 220. Use of the term "call leg" does not imply a particular form of technology. Nor does use of the term imply any particular physical structure of the call leg. The call leg may represent a virtual circuit, audio stream, link or other construct representing audio. Further, reference to a conference bridge does not imply any particular form of technology, e.g., an analog bridge, digital bridge, etc. Accordingly, depending on the embodiment, a call leg can be accomplished in a number of different ways, and again it is possible to use a number of different technologies.

A signaling link 205 between the call handler 210 and the SAM 220 provides the appropriate signaling information necessary to establish and terminate the call leg 204 and indicate the necessary information, including when the remote party is placed on hold. However, in other embodiments, a signaling link 243 may also exist between the call handler 210 and the EHM 240 and may be used to convey such signaling information instead of or in addition to the link 205 between the call handler 210 and the SAM 220. In FIG. 2, signaling or control data is generally shown as a dotted line and voice data is shown as a solid line. Use of the word "link" does not imply any particular logical or physical communication structure or protocol.

As mentioned above, the SAS 260 comprises the SAM 220, the EHM 240, and the callback module 250 that cooperate together to monitor the remote party while the party is on hold and to offer the party opportunities to receive a callback when appropriate. A primary function of the SAM 220 is to listen to the words spoken and/or sounds made by the remote party while on hold and to provide suitable event notifications to the EHM 240. That is to say, a primary function of the SAM 220 is to identify "audio contexts" in which event notifications are to be provided to the EHM 240. Thus, in various embodiments, the SAM 220 is typically configured to identify words spoken by the remote party while on hold indicating the party may wish to receive a callback instead of remaining on hold and accordingly provide an event notification to the EHM 240. While in other embodiments, the SAM 220 may also or exclusively be configured to identify particular sounds made by the remote party and/or detect emotions exhibited by the remote party while remaining on hold indicating the party may wish to receive a callback instead of remaining on hold and accordingly provide an event notification to the EHM 240.

In various embodiments, the SAM 220 generates event notifications that are received by the EHM 240. Depending on the embodiment, these event notifications are generally messages that indicate information about a call involving a party on hold or about words, sounds, and/or emotions detected on the call. An event notification message indicating information about the call is referred to as a "call-related event notification message" or simply a "call-related event notification." For instance, in particular embodiments, a call-related event notification may indicate activities such as the establishment or termination of a call or the placement or removal of a call on hold. An event notification message about words, sounds, and/or emotions detected on the call is referred to as a "speech-related event notification message" or simply a "speech-related event notification." Thus, a speech-related event notification generally indicates an audio context associated with the remote party while on hold.

Accordingly, a speech-related event notification originates from the SAM 220 and is transmitted to the EHM 240 over a signaling link 221. For example, the remote party may state "I would like to receive a callback" while on hold and the SAM 220 may report such an occurrence as a speech-related event notification to the EHM 240. In turn, the EHM 240 ensures that the correct ASM(s) receives the event notification. That is to say, there may be a variety of ASMs executing for various purposes and the EHM 240 ensures that the speech-related event notification related to the remote party requesting a callback is forwarded to the correct ASM(s) (e.g., the callback module 250). The SAM 220 may do the same for call-related event notifications by transmitting such notifications over the signaling link 221. Furthermore, there may be multiple calls handled by a particular ASM at the same time. Accordingly, the EHM 240 may also ensure that the proper contextual information is provided to the ASM (such as, for example, a call identifier) so that the ASM can determine which call the speech-related event notification is related to.

At a high level, the purpose of the EHM 240 is to route event notifications to the appropriate ASM(s). There may be a number of different types of ASMs defined that require receiving event notifications. In one embodiment, the EHM 240 is configured to route a copy of each call-related event notification to each ASM, and route a copy of each speech-related event notification to the appropriate ASM(s). This may involve routing each speech-related event notification to each ASM, or selectively routing each speech-related event notification to only certain ASMs. For example, if there are multiple ASMs used for different purposes, then the EHM 240 ensures the proper ASMs receive the appropriate event notifications via a signaling link 241. Further information as to the reasoning and details of this operation can be found in the aforementioned patent applications that are incorporated by reference.

Therefore generally speaking, to recap, the EHM 240 receives event notifications that may be either call-related or speech-related. Call-related event notifications may be received from the SAM 220 over a signaling link 221 or from the call handler 210 over a signaling link 243. While speech-related event notifications are typically received from the SAM 220 over the signaling link 221. In turn, the EHM 240 informs the appropriate ASMs of the event notifications using the appropriate signaling link 241.

Accordingly, in particular embodiments, a remote party may place a call to the contact center and upon receiving the call, the contact center forwards the call to a call handler 210 such as an IVR. In other embodiments, the IVR could be integrated in the call handler. The call handler 210 (e.g., the IVR) interacts with the remote party over the call and gathers information as to why the remote party has called the contact center. Once the information has been gathered, the call handler 210 determines whether an agent is available to field the call from the remote party. If not, the call handler 210 inquires as to whether the remote party would like to receive a callback or be placed on hold and wait for an available agent. If the remote party indicates that he would like to be placed on hold, then the call handler 210 places the call from the remote party into an on hold queue 230. Depending on the embodiment, the on hold queue 230 generally represents a sequential listing of calls currently placed on hold and waiting for an available agent. Thus, in particular embodiments, the call handler 210 provides the call from the remote party with a virtual placeholder (identifier) that "holds" the remote party's place in the on hold queue 230 until the remote party is connected to an available agent.

Once the call handler 210 has placed the call from the remote party in the on hold queue 230, the call handler sends a call-related event notification over the signaling link 205 to the SAM 220 to notify the SAM 220 that the call has been placed on hold. This event notification may include information that identifies the particular call such as the call's virtual placeholder (identifier) in the on hold queue 230 so that the SAM 220 can track the particular call. In addition, the call handler 210 establishes a call leg 204 between the SAM 220 and the call on hold involving the remote party so that the SAM 220 can monitor the call while the remote party remains on hold.

At this point, the SAM 220 monitors the call to detect any keywords that are spoken by the remote party while on hold that identify an audio context in which the party may like to receive a callback instead of remaining on hold. For instance, in particular embodiments, the remote party may be instructed by the call handler 210 that he may say one or more particular words such as "callback" at any time while on hold and as a result, the remote party will be taken out of the on hold queue 230 and allowed to set up a callback with the contact center. While in other embodiments, the SAM 220 may monitor the call for any keywords that may indicate frustration on the part of the remote party. For example, the SAM 220 may detect the remote party uttering the words "come on, come on," or "this is taking forever!" Further, in particular embodiments, the SAM 220 may evaluate the remote party's speech to detect emotion that may indicate frustration. For instance, pitch and intensity have been shown to be correlated to the amount of energy required to express certain emotions. For example, when a person is in a state of anger or displeasure, the resulting speech of the person is correspondingly loud, fast, and enunciated with strong high-frequency energy, a higher average pitch, and wider pitch range. Therefore, measuring these characteristics of the remote party's speech may help to identify if the remote party seems angry or agitated.

Upon detecting a keyword (e.g., audio context) indicating the remote party may wish to set up a callback, the SAM 220 sends a speech-related event notification 242 to the EHM 240 and the EHM 240 forwards the speech-related event notification 242 to the callback module 250. At this point, the callback module 250 notifies the call handler 210 over a signaling link 251 that the remote party may be interested in setting up a callback. In turn, the call handler 210 interacts with the remote party and obtains information to set up the callback. This information may then be saved to some type of data store 270 so that the callback can be placed to the remote party at the appropriate time. Once the callback has been setup, the remote party is disconnected with the call handler 210. Accordingly, the call handler 210 may disconnect the call leg 204 to the SAS 220 and send a call-related event notification to the SAS 220 to inform the SAS 220 to stop monitoring the call.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Call Handler Module

Figure 3:
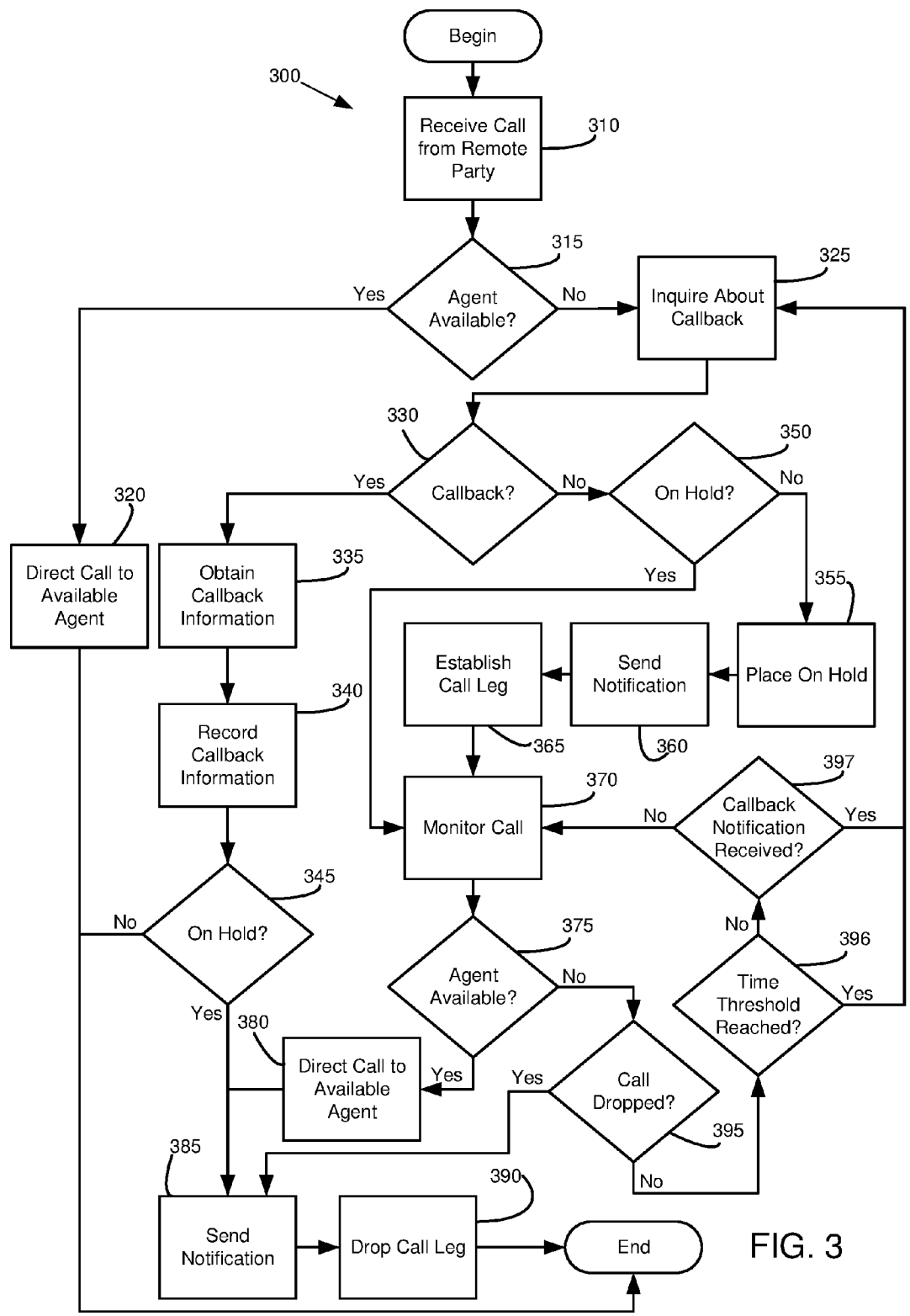
FIG. 3 illustrates a process flow that may be executed by a call handler according to various embodiments of the invention.

Turning now to FIG. 3, additional details are provided regarding a process flow that may be executed by a call handler 210 in providing a remote party with opportunities to set up a callback in accordance with various embodiments of the invention. For purposes of explaining the process, the description will focus on the remote party contacting the contact center and the call handler 210 being an IVR. Specifically, FIG. 3 is a flow diagram showing a call handler module for performing such functionality according to various embodiments of the invention. For example, the flow diagram shown in FIG. 3 may correspond to operations carried out by a processor in a call handler 210 located within the contact center as it executes the call handler module stored in the call handler's volatile and/or nonvolatile memory.

The process 300 begins in Operation 310 with the call handler module receiving the call from the remote party. Although not shown in FIG. 3, the call handler module may initially interact with the remote party to inquire as to why the remote party has placed the call to the contact center and to ascertain who the remote party is. Such information may aid the call handler module in determining where the call needs to be routed. For example, if the remote party is calling the contact center to receive help in setting up a printer recently purchased by the remote party from a computer supplier associated with the contact center, then the call handler module would look to route the call to an agent who has been trained in providing support for the printer. Accordingly, in Operation 315, the call handler module determines whether an agent is available to handle the call. If an agent is available, then the call handler module directs the call to the available agent in Operation 320.

However, if an agent is not available, then the call handler module inquires as to whether the remote party would like to receive a callback or remain on hold for an available agent in Operation 325. Therefore, the call handler 210 interacts with the remote party and receives some type of response (e.g., the remote party verbally expressing or pressing one or more buttons on his phone) identifying which option he would like and the call handler module determines which option the remote party has selected in Operation 330.

If the remote party would like to receive a callback, then the call handler module obtains callback information in Operation 335. For instance, depending on the embodiment, the call handler module requests information from the remote party indicating when and how the remote party would like to receive the callback from the contact center. For example, the call handler module may request a date and time from the remote party or provide one or more dates and/or times for the remote party to choose from for receiving the callback. In addition, the call handler module may request the remote party to identify what telephone number to use to place the callback to the remote party. Further, the call handler module may collect information that is not obtained directly from the remote party. For example, the call handler module may query account information stored by the contact center for the remote party that can be used to identify the remote party. Finally, the call handler module may obtain information from personnel working at the contact center. For example, once the remote party has indicated he would like to receive a callback, the call handler module may connect the remote party with an individual who works at the contact center who converses with the remote party to receive information from the party and enters this information into the contact center's system. Those of ordinary skill in the art can envision other types of information and other ways such information may be collected in light of this disclosure.

Once the call handler module has obtained the callback information, the call handler module records the callback information in Operation 340. Although in some instances, this information may have already been recorded and thus the call handler module may not need to carry out this operation. For instance, if the call handler module connects the remote party to personnel at the contact center to set up the callback, then the individual conversing with the remote party may enter the needed information for the callback instead of the call handler module collecting such information and recording it.

At this point, the call handler module determines whether the remote party is a party that was previously placed on hold in Operation 345. For instance, in particular embodiments, the call handler module determines whether the remote party is associated with a call that has been placed in the on hold queue 230. In this particular instance, the remote party has initially indicated that he would like to receive a callback instead of being placed on hold. Therefore, the remote party is not associated with a call that has been placed in the on hold queue. Finally, the call handler module completes processing the call and the remote party is disconnected. At this point, the contact center monitors the callback information to determine when the callback should be placed to the remote party. Depending on the embodiment, the monitoring may be carried out by the same call handler 210 that received the original call from the remote party or may be carried out by some other component of the contact center such as, for example, an ACD, dialer, or PBX.

Returning now to Operation 330, if the call handler module determines that the remote party would like to be placed (or remain) on hold instead of receiving a callback, then the call handler module first determines if the remote party is associated with a call that was previously placed on hold in Operation 350. If not, then the call handler module places the remote party on hold in Operation 355. Depending on the embodiment, the call handler module may first provide the remote party with an estimate of the time the remote party can expect to remain on hold and provide the remote party with another opportunity to receive a callback before placing the remote party on hold.

At this point, if the call had not been previously placed on hold, then the call handler module sends a call-related event notification in Operation 360 to the SAS 220 identifying the call that has been placed on hold. In addition, the call handler module provides the SAS 220 with a call leg in Operation 365 so that the SAS 220 may monitor the call. As a result, the SAS 220 begins to monitor the call to identify occurrences that may indicate that the remote party would now like to receive a callback instead of remaining on hold.

Continuing on, the call handler module begins to monitor the call in Operation 370. In this instance, the call handler module does not monitor the call by listening in on the call via a call leg such as the SAS 220. Instead the call handler module monitors the call by tracking the call within the on hold queue 230. For instance, in particular embodiments, the call handler module monitors whether the call has reached the end of the queue 230 and an agent is now available to handle the call and/or the amount of time the call remains in the on hold queue 230.

Accordingly, in Operation 375, the call handler module determines whether an agent has become available to handle the call. If so, then the call handler module removes the call from the on hold queue 230 and directs the call to the available agent in Operation 380. Since the call has now been forwarded to an agent to handle, the call no longer needs to be monitored by the SAS 220. Thus, the call handler module sends a call-related event notification to the SAS 220 to inform the SAS 220 that it no longer needs to monitor the call in Operation 385. In addition, the call handler module drops the call leg that was being used by the SAS 220 to monitor the call in Operation 390. In particular embodiments, the call handler module may simply just drop the call leg, which causes the SAS 220 to stop monitoring the call without having to receive a call-related event notification.

However, if an agent has not become available in Operation 375, then the call handler module determines whether the call has been dropped in Operation 395. That is to say, the call handler module determines whether the remote party has decided to no longer wait on hold and has hung up on the call. If so, then the call handler module sends a call-related event notification to the SAS 220 that it no longer needs to monitor the call in Operation 385 and drops the call leg used by the SAS 220 to monitor the call in Operation 390.

However, if the call has not been dropped, then the call handler module determines whether the time the call has remained on hold has met a time threshold in Operation 396. In particular embodiments, the contact center may set a threshold for the amount of time a call should remain on hold before the call handler module checks with the remote party to see if the party would like to remain on hold or would now like to receive a callback. For example, the contact center may set the threshold at fifteen minutes. Accordingly, the call handler module determines in Operation 396 whether the call has remained on hold for fifteen minutes. If so, then the call handler module returns to Operation 325 and inquires as to whether the remote party would now like to receive a callback or would like to remain on hold. If the remote party would now like to receive a callback, then the call handler module repeats the process operations described above with respect to obtaining and recording the callback information needed so that a callback can be placed at the appropriate time to the remote party. However, if the call handler module determines that the remote party would like to remain on hold in Operation 330, then the call handler module determines the call has been previously placed on hold in Operation 350 and returns to monitoring the call in Operation 370. In particular embodiments, the call handler module may also reset the time the call has remained on hold so that the call can be re-evaluated with respect to the threshold.

Likewise, in Operation 397, the call handler module determines whether it has received a notification from the callback module 250 indicating the SAS 220 has detected an occurrence (e.g., a keyword spoken by the remote party) that suggests the remote party may now wish to receive a callback. As previously mentioned, such an occurrence may reflect the remote party uttering a particular word or phrase that suggests the party would now like to receive a callback such as, for example, "I would like a callback." In other instances, such an occurrence may be the remote party uttering a particular word or phrase that suggests frustration or anger by the remote party such as, for example, "why is this taking so long?" While in other instances, such an occurrence may be the remote party uttering a particular sound, word, or phrase that suggests some type of emotion such as anger or frustration.

Accordingly, if the call handler module determines that it has received such a notification, then the call handler module returns to Operation 325 and inquires whether the remote party would now like to receive a callback instead of remaining in hold. Is so, then the call handler module obtains the needed callback information and records the information in Operations 335 and 340. At this point, the call handler module determines that the call for the callback was on hold in Operation 345. As a result, the call handler module sends a call-related event notification to the SAS 220 to stop monitoring the call in Operation 385 and drops the call leg being used by the SAS 220 to monitor the call in Operation 390. Finally, the call with the remote party is disconnected and the call handler module completes processing the call. At this point, the contact center monitors the callback information to determine when the callback should be placed to the remote party.

As a result of the process 300 shown in FIG. 3, the remote party is offered multiple opportunities to receive a callback instead of only an initial opportunity when the call is originally fielded by the call handler 220 and an agent is not currently available. That is to say, that once a remote party has been placed on hold, the remote party may still be offered opportunities to receive a callback. Therefore, if a remote party becomes frustrated from remaining on hold for too long, then various embodiments of the invention recognize such an instance and provide the frustrated remote party an opportunity to receive a callback instead of remaining on hold and frustrated.

Callback Module

Figure 4:
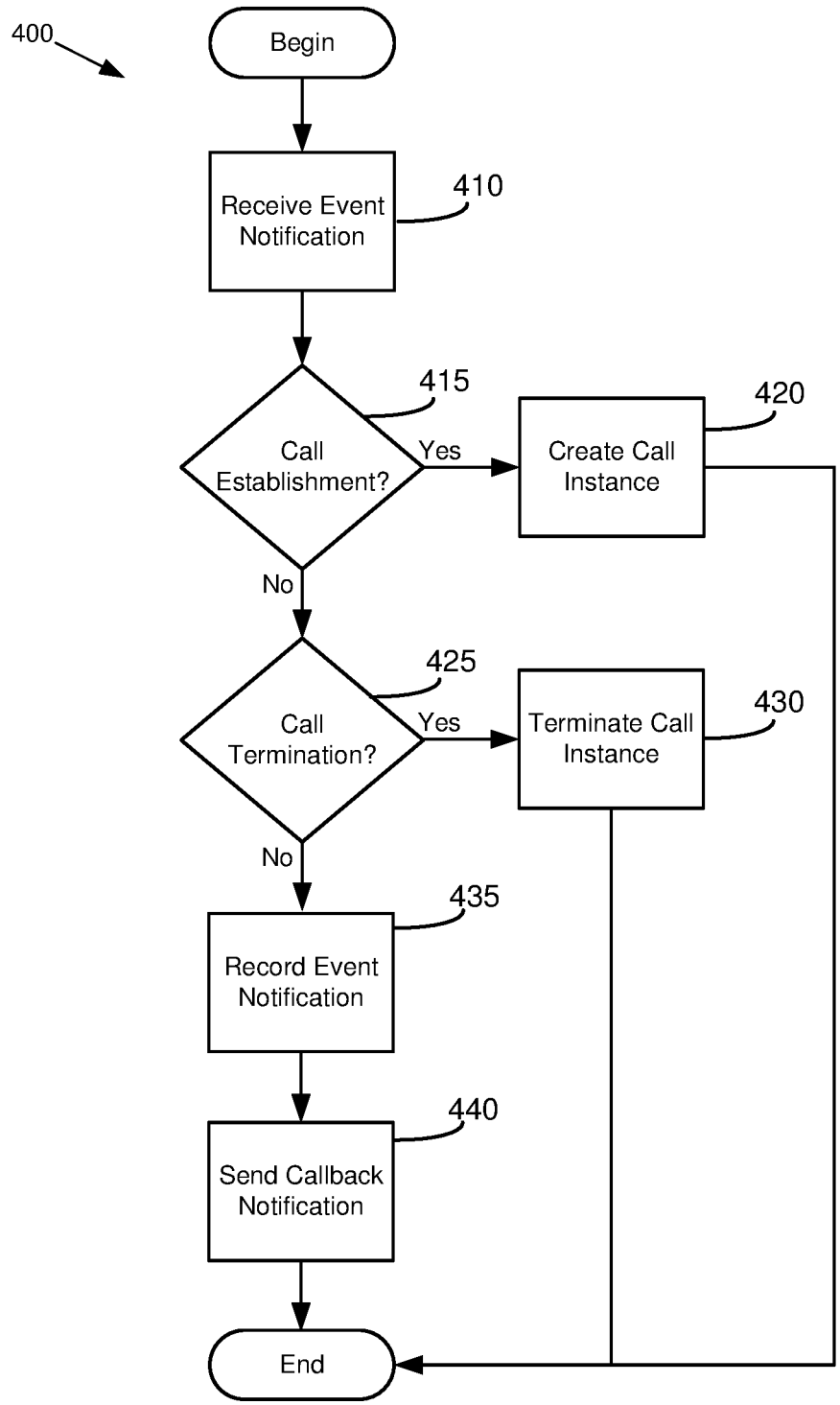
FIG. 4 illustrates a process flow that may be executed by a speech analytics system according to various embodiments of the invention.

Turning now to FIG. 4, additional details are provided regarding a process flow that may be executed by a speech analytics system 260 in detecting a remote party would like to set up a callback once the party has been placed on hold in accordance with various embodiments of the invention. Specifically, FIG. 4 is a flow diagram showing a callback module 250 residing in the speech analytics system 260 for performing such functionality according to various embodiments of the invention. For example, the flow diagram shown in FIG. 4 may correspond to operations carried out by a processor in a speech analytics system 260 located within the contact center as it executes the callback module 250 stored in the speech analytics system's volatile and/or non-volatile memory.

The process flow shown in FIG. 4 describes how event notifications received by the callback module 250 are processed. The logic defined in this process flow operates on each call separately from other calls handled by the callback module 250. Recall that event notifications are received by the callback module 250 to inform the module 250 of various call-related and speech-related events associated with a call that has been placed on hold. For instance, call-related event notifications are generated as a result of a call handler 210 processing a call received by the contact center in which the call handler 210 places the call on hold and establishes a call leg so that the SAM 220 can monitor the audio of the call while on hold. In this respect, the processing is relatively simple in various embodiments, as the callback module 250 creates a call instance upon receiving a call-related event notification that a call has been placed on hold and is being monitored. In particular embodiments, this call instance is understood to be a data structure unique for the particular application (e.g., the callback module 250) that maintains data specific to a call. Accordingly, when a call is reported to the callback module 250 as being placed on hold, the callback module 250 generates a specific data structure (e.g., a call instance) that may then be modified when subsequent call-related and/or speech-related event notifications are received for that call. Further, when the call is reported as no longer being on hold, depending on the embodiment, the callback module 250 may save, process, and/or delete the call instance for the call.

With this in mind, turning now to FIG. 4, the process 400 begins with the callback module 250 receiving an event notification in Operation 410. In turn, the callback module 250 determines whether the event notification is a call-related event notification, and more specifically whether the event notification is a call-related event notification that a call has newly been placed on hold and is being monitored in Operation 415. In particular embodiments, each event notification received by the callback module 250 includes some type of identifier for the particular call that the event notification corresponds to so that the callback module 250 can determine which call the event notification applies to. Thus, if the received event notification is a call-related event notification that a call has been placed on hold, then the callback module 250 creates a call instance for the particular call in Operation 420. In particular embodiments, the creation of the call instance for the call results in generating a data structure stored in memory of the speech analytics system 260 or some other storage device within the contact center.

Returning to Operation 415, if instead the callback module 250 determines the event notification is not for a call that has been newly placed on hold, then the callback module 250 determines whether the event notification is a call-related event notification for a call that has been removed from being on hold in Operation 425. If so, then the callback module 250 terminates the call instance for the particular call in Operation 430. Depending on the embodiment, this operation may also involve the callback module 250 recording information associated with the call instance so that such information may be later referenced.

For instance, a remote party may be placed on hold and monitored and during the monitoring the party may say "this is taking too long" (e.g., a keyword) indicating the party may now wish to receive a callback instead of remaining on hold. However, after receiving an inquiry as to whether the party would like to receive a callback, the party indicates that he would rather remain on hold. Accordingly, information in the call instance for the particular call involving the remote party may include a reference for the speech-related event notification that was received for the occurrence involving the party saying "this is taking too long" and this information may be recorded for the call at the time the callback module 250 terminates the call instance for the call. As a result, the contact center may later reference the recorded information to identify instances in which a remote party spoke a keyword and nonetheless, wanted to remain on hold. Such information may help the contact center to better fine tune their list of keywords to be monitored. For example, if the contact center determines that forty percent of parties who are on hold and say "this is taking too long" still choose to remain on hold, then the contact center may consider not using this phrase as a keyword to trigger a speech-related event notification for purposes of offering a remote party on hold an opportunity to set up a callback.

Returning now to FIG. 4, if the callback module 250 determines in Operation 425 that the event notification is not a call-related event notification related to a call that has been removed from being on hold, then the callback module 250 records receipt of this event notification in Operation 435. This is because in such an instance the event notification is a speech-related event notification indicating the remote party on the call may wish to now receive a callback instead of remaining on hold. In particular embodiments, the event notification may also identify the keyword that the SAS 220 detected that caused the SAS 220 to send the event notification and this information may also be recorded. As previously mentioned, the term "keyword" may not always be related to a particular word spoken by the remote party but may also include a phrase, sound, or an emotion detected by the SAS 220. For instance, the "keyword" that triggers a particular speech-related event notification may be the phrase "this is taking too long" or the emotion anger. Thus, the information on the keyword received along with the speech-event notification may include an identifier for this particular keyword as opposed to the keyword itself.

Finally, the callback module 250 sends a callback notification to the call handler 210 in Operation 440. As a result, the call handler 210 checks with the remote party on the call to determine whether the remote party would now like to receive a callback instead of remaining on hold. For instance, in an embodiment in which the call handler 210 is an IVR, the IVR interacts with the remote party to inquire as to whether the remote party would like to receive a callback or remain on hold.

Figure 5:
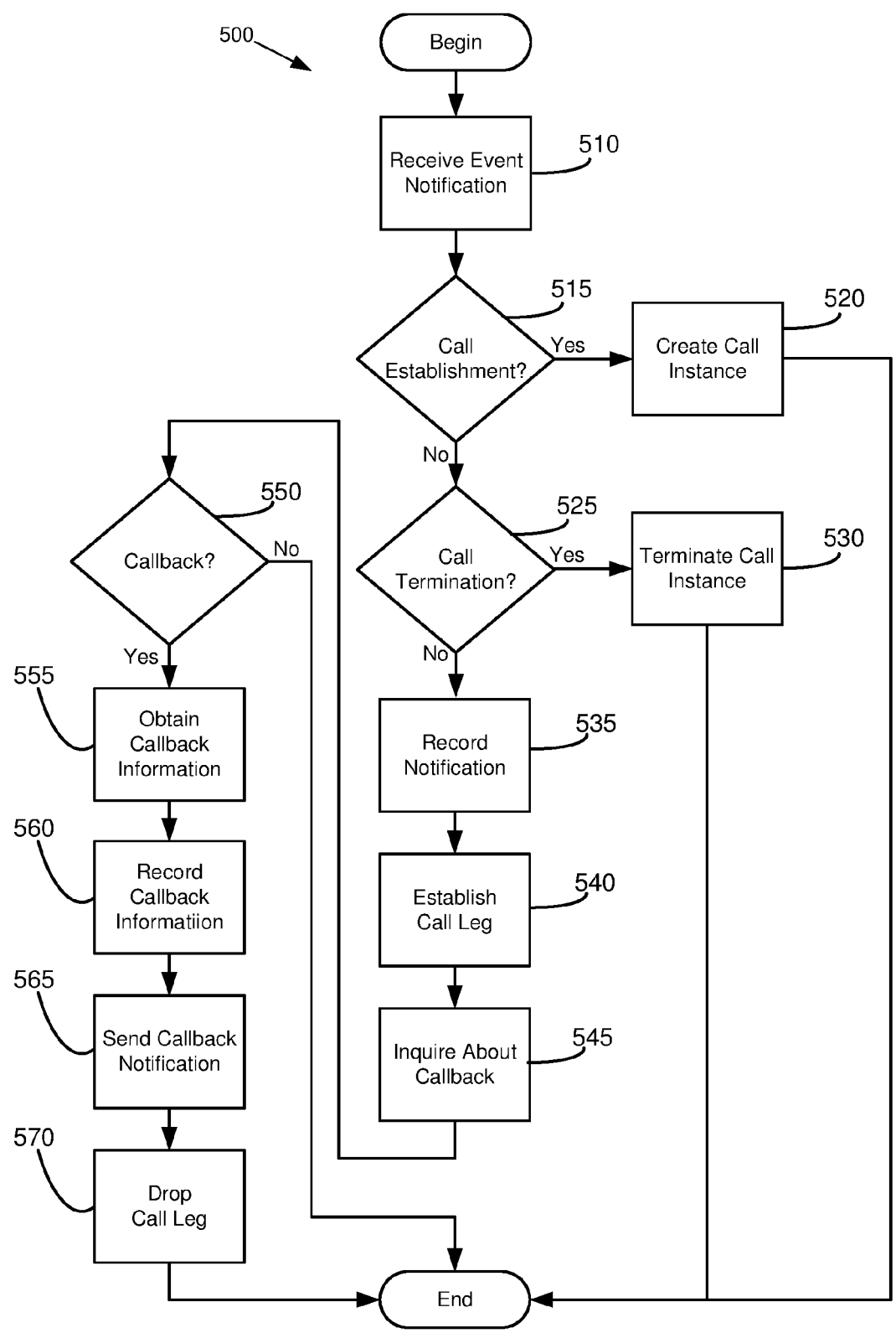
FIG. 5 illustrates an alternative process flow that may be executed by a speech analytics system according to various embodiments of the invention.

Looking now at FIG. 5, a different embodiment of the process flow is shown for the callback module 250. For this particular embodiment, the callback module serves as an IVR and interacts with the remote party instead of sending a notification to the call hander 210 to interact with the remote party to determine whether the party would like to now receive a callback instead of remaining on hold. For this particular embodiment, Operations 510 thru 535 are carried out by the callback module 250 in similar fashion to Operations 410 thru 435 described for the process flow shown in FIG. 4. However, for this embodiment, the process 500 involves the callback module 250 interacting directly with the remote party on the call to determine if the party would now like to receive a callback instead of remaining on hold.

Accordingly, upon the callback module 250 receiving a speech-related event notification indicating the remote party may now wish to setup a callback, the callback module 250 establishes a call leg with the call on hold associated with the remote party in Operation 540. Depending on the embodiment, the callback module 250 may accomplish this operation by requesting the call handler 210 to establish the call leg between the call on hold associated with the remote party and the callback module 250 or the callback module 250 may be configured to perform this task itself.

Once the call leg is established between the call on hold and the callback module 250, the callback module 250 interacts with the remote party to inquire as to whether the party would now like to receive a callback or remain on hold in Operation 545. As mentioned, the interaction can be carried out by the callback module 250 in the same fashion as would an IVR. That is to say, for instance, the callback module 250 may provide the remote party with information and/or questions and the remote party may respond by speaking or selecting buttons on the remote party's telephone device.

At this point, the callback module 250 determines whether the remote party would like to receive a callback or remain on hold based on the information obtained by interacting with the remote party in Operation 550. If the callback module 250 determines the remote party would like to receive a callback, then the callback module 250 obtains information needed to set up the callback in Operation 555 and records this information in Operation 560 in a similar fashion as described above with respect to the call handler module.

Once the callback has been set up, the callback module 250 sends a notification to the call handler 210 to inform the call handler 210 that the remote party is no longer to remain on hold. Accordingly, call handler 210 can remove the call from the on hold queue 230. Finally, the callback module 250 drops the call leg to the call on hold associated with the remote party in Operation 570. Again, depending on the embodiment, the callback module 250 may accomplish this operation by having the call handler 210 release the call leg or by releasing the call leg itself.

Exemplary Computer Processing Device

Figure 6:
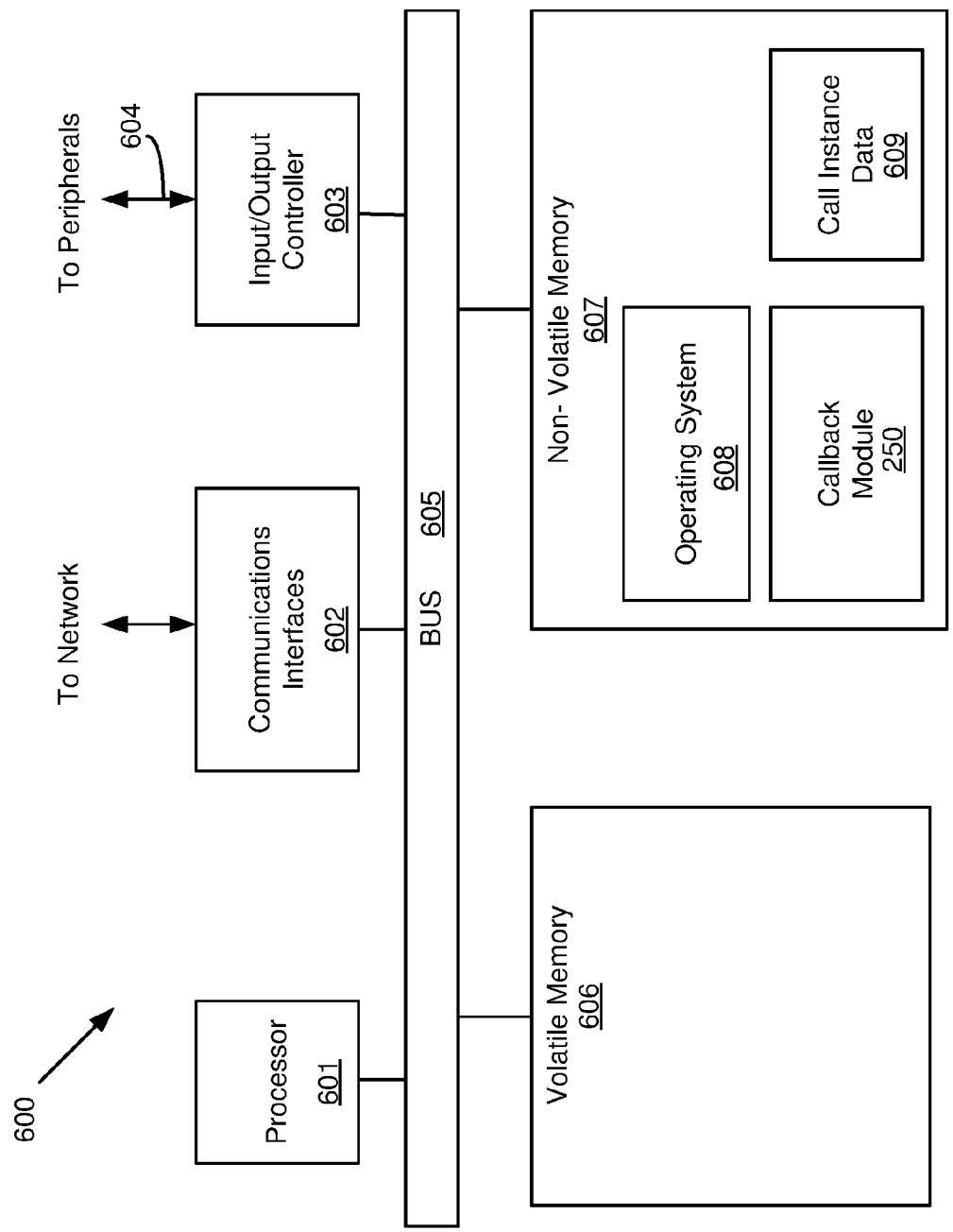
FIG. 6 illustrates an embodiment of a processing device for practicing various technologies and concepts disclosed herein.

FIG. 6 is an exemplary schematic diagram of a computer processing system 600 that may be used in embodiments to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. The system 600 may apply to one or more components (such as a call handler 210 or SAS 260) executing any of the above-mentioned modules such as, for instance, the call handler module, the SAM 220, the EHM 240, and/or the callback module 250, although only the callback module is shown in FIG. 6.

As shown in FIG. 6, the processing system 600 may include one or more processors 601 that may communicate with other elements within the processing system 600 via a bus 605. The processor 601 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In particular embodiments, the processing system 600 may include one or more communications interfaces 602 for communicating data via a data network, such as a local network, with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

An input/output controller 603 may also communicate with one or more input devices or peripherals using an interface 604 such as, but not limited to: a keyboard, a mouse, a touch screen/display input, microphone, pointing device, etc. The input/output controller 603 may also communicate with output devices or peripherals, such as displays, printers, speakers, headsets, banner displays, etc. These may be used, in part, to receive administrator input, such as for configuring the system's operation.

The processor 601 may be configured to execute instructions stored in volatile memory 606, non-volatile memory 607, or other forms of computer-readable storage media accessible to the processor 601. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 607 may store various program code modules and data, which also may be loaded into the volatile memory 606 at execution time (though not shown as such in FIG. 6). For example, the non-volatile memory 607 may store one or more modules such as the callback module 250 that implement and perform the above-mentioned process flows containing instructions for performing the processes and/or functions associated with the technologies disclosed herein, as well as operating system code 608. These modules may also manage data, such as call instance data 609 for example that is used for tracking various calls placed on hold. The data and/or modules in the non-volatile memory 607 may be copied in the volatile memory 606 at run time. The volatile memory 606 and/or non-volatile memory 607 may be used to store other information including, but not limited to: records, applications, programs, scripts, source code, object code, byte code, compiled code, interpreted code, machine code, executable instructions, or the like. These may be executed or processed by, for example, the processor 601 and may form a part of, or may interact with, the modules.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). The computer readable storage media includes all the above tangible identified computer readable media (including volatile and non-volatile media), but does not encompass a transitory, propagating signal, photon-based storage media, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation. Furthermore, the examples for illustrating the concepts and the technologies herein have focused on agents in a contact center, but could be easily applied to other types of applications.

The invention claimed is:

1. A system for setting up a callback for a party involved in a telephone call, the system comprising:
    a speech analytics component configured to:
        listen in on audio of the telephone call once the telephone call has been placed on hold to detect an event indicating to offer the callback to the party, the event comprising at least one of a word spoken by the party, a sound made by the party, and an emotion displayed by the party; and
    an interactive voice response component configured to:
        in response to the event indicating to offer the callback to the party being detected, interact with the party to obtain information from the party with respect to placing the callback to the party; and
        record the information so that the callback can be placed to the party at a later time.

2. The system of claim 1 further comprising a call hander component configured to place the callback to the party at the later time.

3. The system of claim 1, wherein the interactive voice response component is further configured to interact with the party after a predetermined period of time the party has been on hold to determine whether the party would like to receive the callback or remain on hold.

4. The system of claim 1, wherein the interactive voice response component is further configured to also provide the party with an approximate time the party is expected to remain on hold.

5. The system of claim 1, wherein the interactive voice response component is configured to, prior to the telephone call being placed on hold, provide the party with an option to receive the callback.

6. The system of claim 1 further comprising a call hander component configured to:
   receive the telephone call from the party; and
   after receiving the telephone call:
      place the telephone call on hold; and
      establish a call leg so that the speech analytics component can listen in on the audio of the telephone call using the call leg.

7. A non-transitory, computer-readable medium comprising computer-executable instructions when executed by at least one computer processor cause the at least one computer processor to:
   listen in on audio of a telephone call involving a party once the telephone call has been placed on hold to detect an event indicating to offer a callback to the party, the event comprising at least one of a word spoken by the party, a sound made by the party, and an emotion displayed by the party; and
   in response to detecting the event, interact with the party to obtain information from the party with respect to placing the callback to the party; and
   record the information so that the callback can be placed to the party at a later time.

8. The non-transitory, computer-readable medium of claim 7, wherein the computer-readable instructions when executed by the at least one computer processor cause the at least one computer processor to have the callback placed to the party at the later time.

9. The non-transitory, computer-readable medium of claim 7, wherein the computer-readable instructions when executed by the at least one computer processor cause the at least one computer processor to interact with the party after a predetermined period of time the party has been on hold to determine whether the party would like to receive the callback or remain on hold.

10. The non-transitory, computer-readable medium of claim 7, wherein the computer-readable instructions when executed by the at least one computer processor cause the at least one computer processor to also provide the party with an approximate time the party is expected to remain on hold.

11. The non-transitory, computer-readable medium of claim 7, wherein the computer-readable instructions when executed by the at least one computer processor cause the at least one computer processor to, prior to the telephone call being placed on hold, provide the party with an option to receive the callback.

12. A method for setting up a callback for a party involved in a telephone call, the method comprising the steps of, once the telephone call has been placed on hold:
   listening in on audio of the telephone call by a speech analytics system to detect an event indicating to offer the callback to the party, the event comprising at least one of a word spoken by the party, a sound made by the party, and an emotion displayed by the party; and
   in response to detecting the event indicating to offer the callback to the party, interacting with the party by an interactive voice response system to obtain information from the party with respect to placing the callback to the party; and
   recording the information so that the callback can be placed to the party at a later time.

13. The method of claim 12 further comprising the step of placing the callback to the party by a call handler system at the later time.

14. The method of claim 12 further comprising the step of interacting with the party by the interactive voice response system after a predetermined period of time the party has been on hold to determine whether the party would like to receive the callback or whether the party would like to remain on hold.

15. The method of claim 12 further comprising the step of providing the party with an approximate time the party is expected to remain on hold by the interactive voice response system.

16. The method of claim 12 further comprising the step of, prior to the telephone call being placed on hold, providing the party with an option to receive the callback.

17. The method of claim 12 further comprising the steps of:
   receiving the telephone call from the party by a call hander system; and
   after receiving the telephone call:
      placing the telephone call on hold by the call hander system; and
      establishing a call leg by the call hander system so that the speech analytics system can listen in on the audio of the telephone call.

* * * * *